United States Patent [19]

Woodhams et al.

[11] Patent Number: 5,399,308

[45] Date of Patent: * Mar. 21, 1995

[54] PROCESS FOR THE CONTINUOUS PRODUCTION OF HIGH MODULUS ARTICLES FROM HIGH MOLECULAR WEIGHT PLASTICS

[76] Inventors: Raymond T. Woodhams, 33 The Palisades, Toronto, Ontario, Canada, M6W 2W9; Kenneth R. Tate, 4 Althea Road, Toronto, Ontario, Canada, M6S 2P1

[*] Notice: The portion of the term of this patent subsequent to Aug. 10, 2010 has been disclaimed.

[21] Appl. No.: 4,614

[22] Filed: Jan. 14, 1993

Related U.S. Application Data

[63] Continuation of Ser. No. 779,821, Oct. 21, 1991, Pat. No. 5,234,652.

[30] Foreign Application Priority Data

Dec. 20, 1990 [GB] United Kingdom ............. 9027699

[51] Int. Cl.⁶ ................................... B29C 47/38
[52] U.S. Cl. ...................... 264/210.2; 264/210.6; 264/211.21; 264/288.4; 264/331.17
[58] Field of Search ............ 264/210.2, 210.8, 210.6, 264/211, 211.21, 323, 331.17, 176.1, 288.4

[56] References Cited

U.S. PATENT DOCUMENTS

| | | | |
|---|---|---|---|
| 3,382,535 | 5/1968 | Ferrari | 425/461 |
| 3,925,525 | 12/1975 | LaNieve | 264/204 |
| 4,053,270 | 10/1977 | Collier | 425/144 |
| 4,518,552 | 5/1985 | Matsuo et al. | 264/323 |
| 4,824,619 | 4/1989 | Okada et al. | 264/40.1 |
| 4,902,460 | 2/1990 | Yagi et al. | 264/210.8 |
| 4,948,545 | 8/1990 | Bashir et al. | 264/210.6 |
| 5,055,248 | 10/1991 | Motooka et al. | 264/210.6 |
| 5,057,261 | 10/1991 | Ohori et al. | 264/210.6 |
| 5,068,073 | 11/1991 | Pennings et al. | 264/210.8 |
| 5,080,849 | 1/1992 | Bastiaansen et al. | 264/210.8 |
| 5,234,652 | 8/1993 | Woodhams et al. | 264/211.21 |

FOREIGN PATENT DOCUMENTS

| | | | |
|---|---|---|---|
| 0190878 | 8/1986 | European Pat. Off. | 264/210.7 |
| 0401942 | 12/1990 | European Pat. Off. | 264/210.1 |
| 57-193319 | 11/1982 | Japan | 264/211 |
| 59-227420 | 12/1984 | Japan | 264/211 |
| 60-189420 | 9/1985 | Japan | 264/210.1 |
| 2-26915 | 1/1990 | Japan | 264/211 |

*Primary Examiner*—Jeffery R. Thurlow
*Attorney, Agent, or Firm*—Shoemaker and Mattare, Ltd.

[57] ABSTRACT

A process for producing a high modulus article includes forcing a high molecular weight plastic material, such as polyethylene, through a passage of which the cross-sectional area diminishes in the forward direction of plastic flow, thus producing an extrudate. The plastic material is extruded while it is close to or at its melt temperature, and it is lubricated to obtain substantially plug flow through the passage. The speed at which the plastic material flows through the passage is adjusted so that the elongational velocity gradient at any longitudinal position within the passage does not exceed about 2.6 sec.$^{-1}$, thus minimizing the degree of molecular orientation in the extrudate. The extrudate can be deformed by drawing while it is maintained at or close to its melt temperature, thus producing an oriented, deformed extrudate. The oriented extrudate is then quickly cooled to preserve the orientation. A suitable plastic material is high molecular weight polyethylene with an average molecular weight lying between about 500,000 and about 1,500,000.

12 Claims, 15 Drawing Sheets

PROCESS FOR THE CONTINUOUS PRODUCTION OF HIGH MODULUS ARTICLES FROM HIGH MOLECULAR WEIGHT PLASTICS

This is a continuation of application Ser. No. 07/779,821, filed Oct. 21, 1991, now U.S. Pat. No. 5,234,652.

This invention relates to a process allowing the melt extrusion of exceptionally ductile, very high molecular weight polyethylenes (VHMWPE) and ultra high molecular weight polyethylenes (UHMWPE) at relatively high extrusion speeds, such extrudates being capable of high deformation ratios leading to high strength and modulus in the end product. The present invention also relates to the complete procedure including the drawing or other form of deformation.

BACKGROUND OF THIS INVENTION

The desirability of replacing conventional engineering materials has led material scientists and engineers to look at new materials or the processing of existing materials to enhance their mechanical properties. It is the latter route which is the subject of this invention.

The carbon-carbon bond is the strongest bond known to man. If one could somehow process materials containing this bond so that all the carbon-carbon bonds were aligned in the same direction and closely spaced relative to one another, this would yield a material with very high modulus and strength. The important question is which materials possess the possibility of being processed in such a way as to take advantage of the inherent strength of the carbon-carbon bond.

Scientists have known for a long time that the polyethylene molecule, because of its simple structure, and high density of carbon-carbon bonds per unit area, is a material with one of the highest theoretical values of tensile modulus and strength. The theoretical modulus and strength are thought to be approximately 300 GPa and 20 GPa, respectively. This is quite remarkable if one considers that the modulus and strength of steel are 200 GPa and 2 GPa, respectively. The challenge has been to process polyethylene in such a way as to obtain a material which comes as near as possible to the theoretical values of modulus and strength.

Conceptually, achieving a high modulus and strength involves uncoiling the molecule and stretching it out to align the carbon-carbon bonds in the backbone. In practice, however, this is very difficult due to the presence of inter- and intramolecular entanglements which hinder the extent to which the molecules can be drawn out.

There are essentially three routes for the expression of oriented polyethylene articles. These are solid, solution, and melt phase processing. In each process, the polyethylene molecules are in various morphological states prior to orientation.

In solid phase processing, orientation takes place while the material is below the melting point or in the crystalline state. Because of this, operating pressures are very high, and consequently the process is relatively slow. In addition, the process is usually discontinuous. Therefore, attempts at commercializing this orientation route have been very limited. The process does, however, produce articles of relatively high values of modulus and strength; typical values are 80 GPa and 1 GPa, respectively. The one advantage of solid phase processing is the ability to produce complex shapes because of the long relaxation times of polyethylene in the solid phase.

Prior to the advent of low entanglement density reactor grade polyethylenes, one of the limitations of solid phase processing was that the entanglements present during the manufacture of polyethylene were still present during processing. To take advantage of the low entanglement density, however, the polymer must be processed in the solid phase since any excursion above the melting point destroys the low entanglement morphology.

In solution processing, the degree of entanglement is reduced by dissolving the polyethylene molecules in a suitable solvent at such a concentration that the individual polyethylene molecules are just barely in contact with one another. The next step is to process this solution, remove the solvent and draw out the resulting precursor to very high draw ratios, this being possible due to the reduction in the entanglement density. This method is essentially the basis of all the so-called "gel-spinning" processes. The technique produces fibers of very high modulus and strength, typical values being 100 GPa and 3 GPa. This process is, however, very expensive because of the large amount of solvent recovery required. Furthermore, the method is restricted to the production of articles with at least one small dimension such as fibers or tapes, due to mass transfer limitations.

The remaining route for the production of oriented articles from polyethylene is via the melt phase. This technique is not as well developed as the solid or solution phase methods. The principle reason for this is that, because of the low thermal conductivity of polymers combined with the short relaxation times of conventional extrusion-grade polyethylene molecules in the melt, flow-induced orientation cannot be locked into the final structure to produce articles with significant values of modulus and strength. The advantage of a melt phase process is, however, the possibility of using a conventional extruder which might allow one to produce continuous products at commercial rates of production.

Recent work has shown that certain grades of high molecular weight polyethylene have the ability to be melt-drawn to produce articles of relatively high modulus and strength; typical values are 80 GPa and 1 GPa, respectively. The source of these high mechanical properties is the unique morphology produced when these grades of polyethylene are oriented in the melt phase at critical conditions of temperature and strain rate.

PRIOR ART

Among the significant prior art publications is the publication of European patent application 0115192 on Aug. 8, 1984, the applicant being Mitsui Petrochemical Industries, Ltd.

A further patent of some interest is U.S. Pat. No. 3,925,525, issued Dec. 9, 1975 to LaNieve. Yet another prior document of interest is the publication of European patent application 89201375.4 on Dec. 6, 1989, the applicant being Stamicarbon B.V.

GENERAL DESCRIPTION OF THIS INVENTION

In light of the general state of the art as described in the foregoing two sections, it is an object of one aspect of this invention to implement these special grades of polyethylene into a process using a screw extruder, the process producing oriented articles continuously at high rates of production. An object of a further aspect of this invention is a process which will produce an extrudate of relatively low orientation, suitable for a subsequent step of deformation at high deformation ratios.

An object of a further aspect of this invention is the utilization of other plastics in the contemplated processes, for example polypropylene.

A process for the continuous production of a high modulus extrudate, including the steps:

a) continuously forcing a high molecular weight plastic material through a passage in a die, the die having a die exit, the passage having a cross-sectional area which decreases in the forward direction of plastic flow, thereby to produce an extrudate at the die exit, said plastic material being substantially free of diluents and solvents, b) lubricating the plastic material adjacent the passage to obtain substantially plug flow of the material through the die passage, c) moving the plastic material through the die passage at a speed profile which is such as to result in a smooth, high quality extrudate, d) adjusting the temperature of the die so as to cause the plastic material to at least partially crystallize within the die prior to extrusion, and e) applying a tensile force to the crystallized extrudate as it emerges from the die, thus aiding the extrusion process.

BRIEF DESCRIPTION OF THE DRAWINGS

One embodiment of an apparatus suitable for carrying out this process is illustrated in the accompanying drawings, in which like numerals denote like parts throughout the several views, and in which.

DETAILED DESCRIPTION OF THE DRAWINGS

Figure 1:
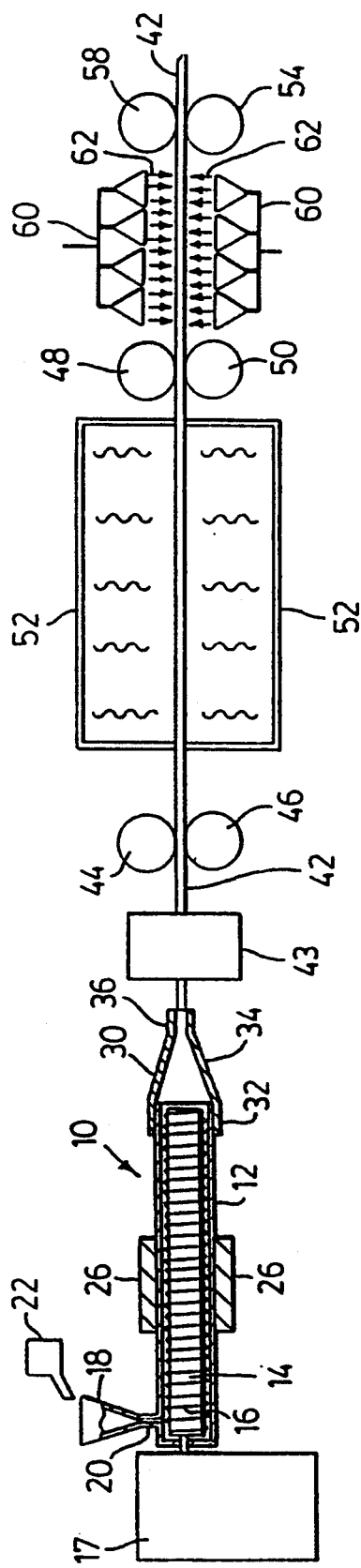
FIG. 1 is a somewhat schematic illustration of the major components of an apparatus adapted to carry out the process of this invention.

Attention is first directed to FIG. 1 which shows a screw extruder generally at 10 which includes a main barrel 12 that is essentially cylindrical. Within the barrel 12 is a rotary screw 14 having a helical thread 16. Though not illustrated, the depth of the thread 16 may decrease toward the rightward end, thus compressing the material. Means 17 are provided to rotate the rotary screw 14 in a direction which causes the thread 16 to move material from left to right. The means 17 typically includes a motor and speed-reduction gearing. A hopper 18 having a throat 20 communicates with the space between the rotary screw 14 and the inside of the barrel 12. A source 22 of polyethylene in powdered form is provided, the polyethylene being mixed with a suitable lubricant of known type.

The numeral 26 designates a jacket heater surrounding the barrel 12 and adapted to provide sufficient heat to ensure that the mixture of UHMWPE and processing aid remains above the melt temperature which is typically about 140° C. Contrariwise, depending upon the speed of extrusion and other process factors, it may be necessary to cool the barrel 12 in order to withdraw excessive heat caused by the working of the material.

Secured to the rightward (downstream) end of the barrel 12 is an extruder head 30 which, in this particular embodiment, includes a cylindrical portion 32, a conical portion 34 downstream of the cylindrical portion 32, and a tubular portion 36 downstream of the conical portion 34, the portion 36 also being referred to as the die-land.

The inner surface of the extrusion head 30 should be relatively smooth, in order to allow good flow of the UHMWPE.

Figure 2:
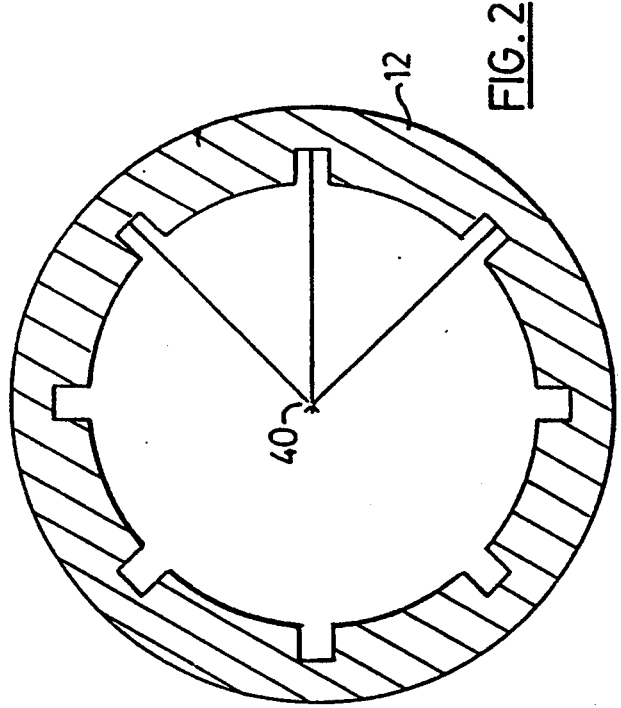
FIG. 2 is a cross-sectional view of the barrel component of FIG. 1.

In order to allow the thread 16 of the rotary screw 14 to move the granulated mixture from left to right along the barrel 12, it is sufficient to provide longitudinal grooves 40 on the inside surface of the barrel 12, these being illustrated in part in FIG. 2. The effect of the grooves 40 is to increase the effective friction between the mixture of ingredients and the barrel 12, so that the thread 16 of the rotary screw 14 can grip the mixture and force it rightwardly toward the extrusion head 30. Alternatively, the grooves may be provided on an insert placed within the barrel 12.

Because of the heat and pressure to which the mixture is subjected, the powdered polyethylene and processing aid coalesce in the extruder to form the melt phase. This results in a single rod or extrudate 42 emerging from the tubular portion 36 of the extrusion head 30. Upon extrusion, the rod 42 may optionally pass through an annealing step, represented in FIG. 1 by a box 43, following which the rod 42 is gripped in the nip between two rolls 44 and 46. The rod 42 then extends to a second pair of rolls 48 and 50. The numeral 52 designates heating units adapted to maintain the temperature of the rod above but close to the melt temperature (typically about 140° C.). The two sets of nip rolls are positively and differentially driven such that the rod moves at a greater speed through the downstream rolls 48, 50 than it does through the upstream rolls 44, 46. This results in a stretching or elongation of the rod between the bridle pairs which longitudinally orients the individual polyethylene chains.

It is to be understood that two or more extrudates could be produced simultaneously, depending upon the configuration of the head 30.

Subsequent to the elongation phase of the process, the elongated and thinned-out rod is passed through the nip between further rollers 54 and 58, which rotate with the same peripheral speed as do the rollers 48 and 50. A cooling means 60 provides spray cooling jets 62 that produce a high rate of cooling which has the effect of minimizing the relaxation of orientation.

What has been disclosed above is, in its essence, a process for the continuous production of oriented articles of high modulus and strength via the melt phase extrusion of UHMWPE and a processing aid in a screw extruder, followed by optional annealing (the reasons for which are discussed later in this specification), followed by melt phase free drawing of the extrudate in an elongational flow field at critical conditions of temperature and strain rate. Typically, a suitable polymer would be a UHMWPE which has a molecular weight between 500,000 and 5,000,000, and preferably between 700,000 and 2,000,000. The UHMWPE is essentially a linear homopolymer of ethylene or a copolymer of ethylene containing at least 95% by weight of ethylene having a density from 0.85 to 1.0 g/cm$^3$ as measured by ASTM D 1505.

During investigations of this development, where the extrudate passed directly to the drawing phase without annealing, difficulties were encountered in attempting to melt draw the sample as extruded. In FIG. 1, melt drawing takes place between the pair of rolls 44, 46 and the pair of rolls 48, 50. The extrudate was found to exhibit very high melt strength (making it difficult to pull the sample apart), and to fail at a relatively low draw ratio. A prior publication (Pennings, A. J., et al, Journal of Materials Science, 1988, Volume 23, page 3459-3466) discusses the influence of spinning temperature and spinline stretching on morphology and properties of gel-spun polyethylene fibres. The authors concluded that, the greater the degree of orientation in the as-extruded filament (prior to drawing), the poorer the drawability and the subsequent mechanical properties of the final fibre.

To assess whether the same phenomenon was leading to the poor drawability of the extrudates, the latter were subjected to an annealing phase experiment on the assumption that this would destroy the orientation caused by the extrusion process. The word "assumption" is used here because the techniques for assessing orientation are macroscopic in nature. The precise change in the level of inter- and intramolecular entanglements that are the underlying causes for the changes in drawability cannot be directly ascertained. Only macroscopic morphological changes can be detected, and correlated with mechanical properties.

Figure 3:
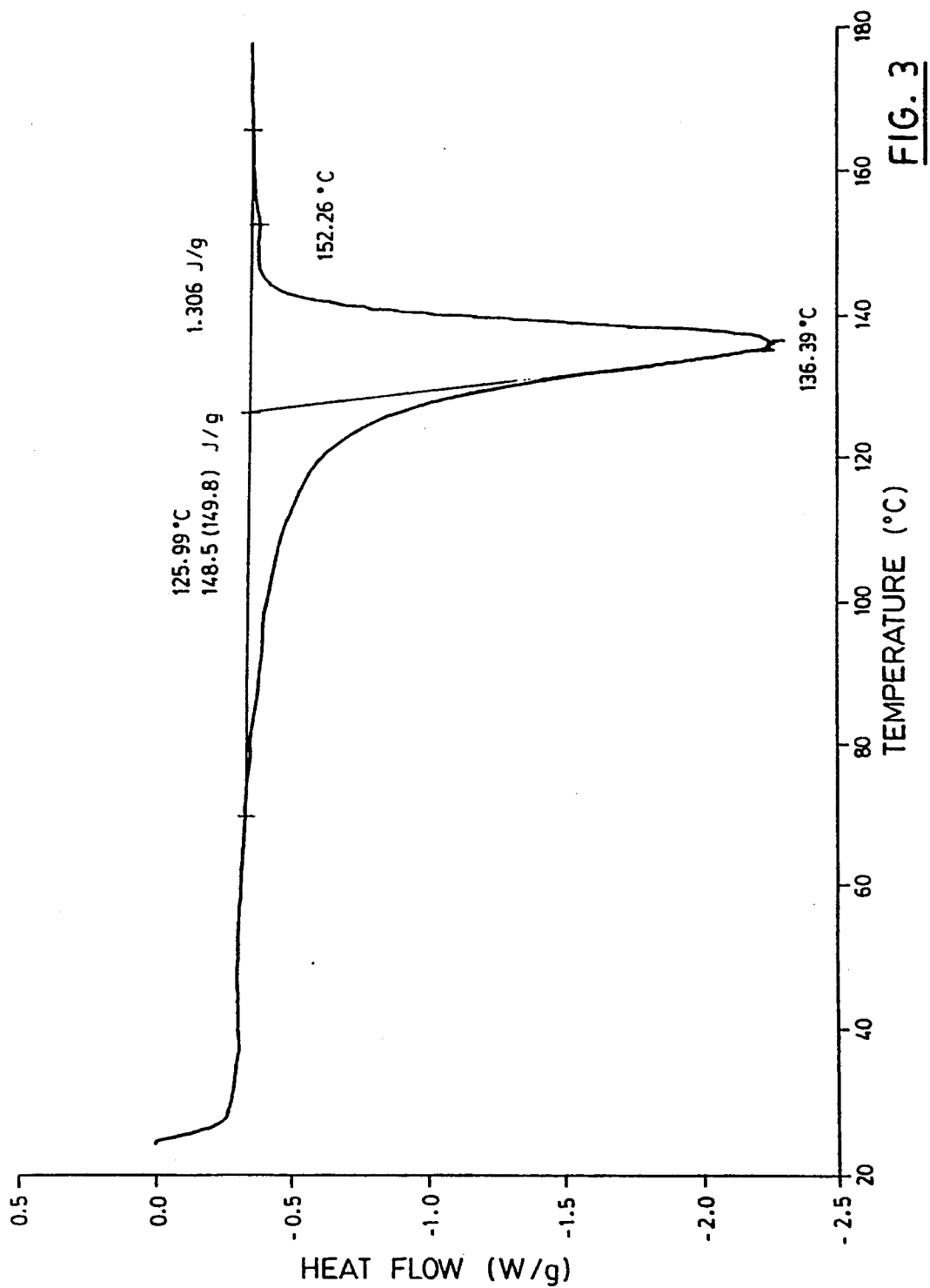
FIGS. 3, 4 and 5 are traces produced by a Differential Scanning Calorimeter (DSC) useful for an understanding of this invention.
Figure 4:
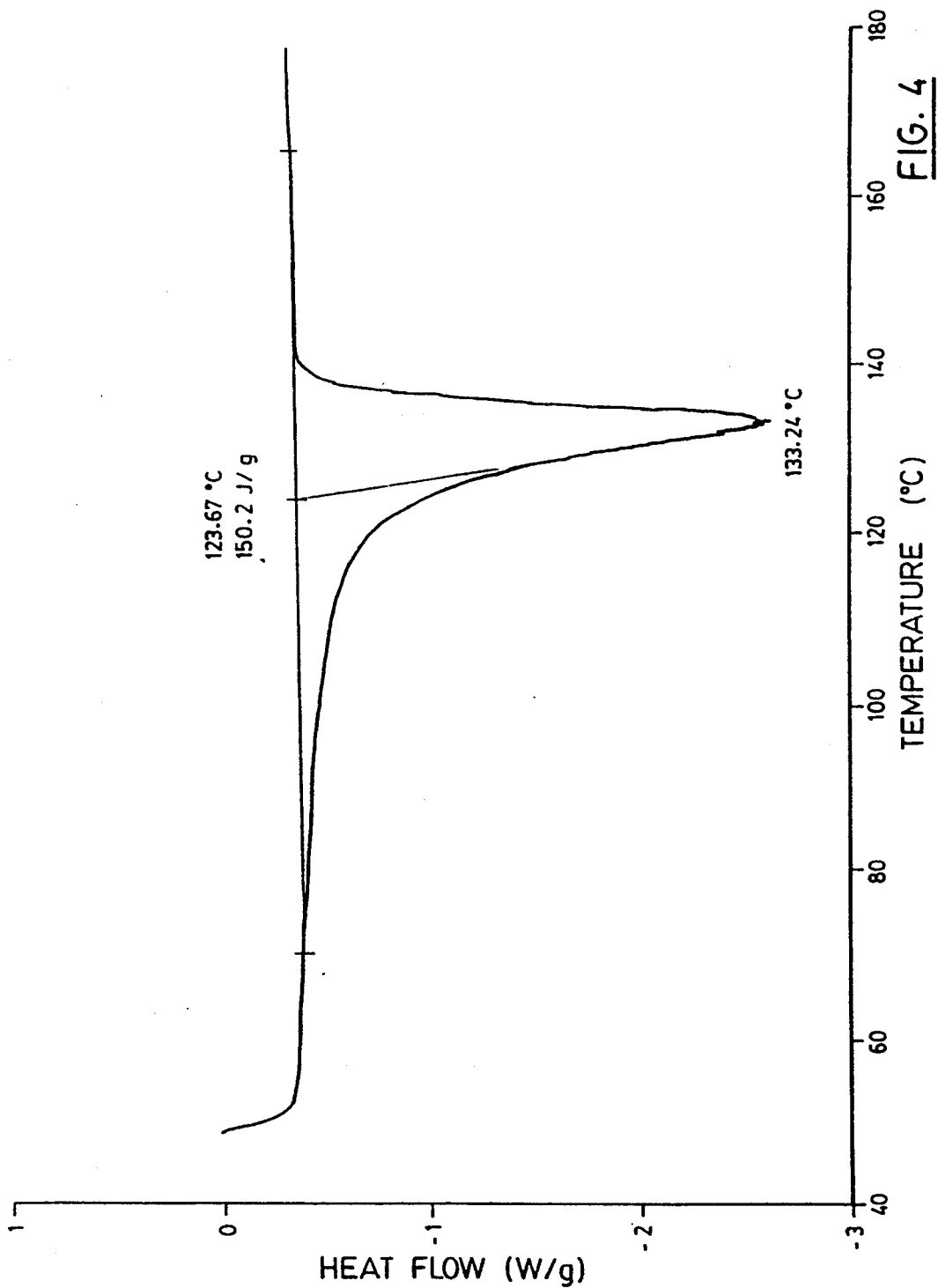

A standard tool used in orientation research is the Differential Scanning Calorimeter (DSC). This device looks for changes in microstructure by measuring the heat evolved/absorbed during certain morphological transitions. FIG. 3 shows a typical DSC trace for the sample prepared under the conditions given below in this specification. The large main peak at 136° C. is due to the melting of the normal lamellar crystal structure found in unoriented polyethylene. The small peak at 152° C. is due to a transition from orthorhombic to hexagonal crystal structure in the polyethylene unit cell, and is found in oriented polyethylene which is constrained during melting. FIG. 4 shows a DSC trace for the same extruded sample after it had been annealed at 200° C. for 30 minutes. In FIG. 4, the peak at 152° C. has disappeared, which implies an apparent destruction in orientation. The melt drawability of the annealed samples was observed to dramatically improve. Accordingly, under some conditions, it is important to subject the extrudate to a thermal treatment having the effect of destroying the orientation produced in the extrusion process. (As will subsequently be shown, however, certain process conditions and die configurations can result in an extrudate having minimal orientation, thus not always requiring an annealing step.)

Figure 5:
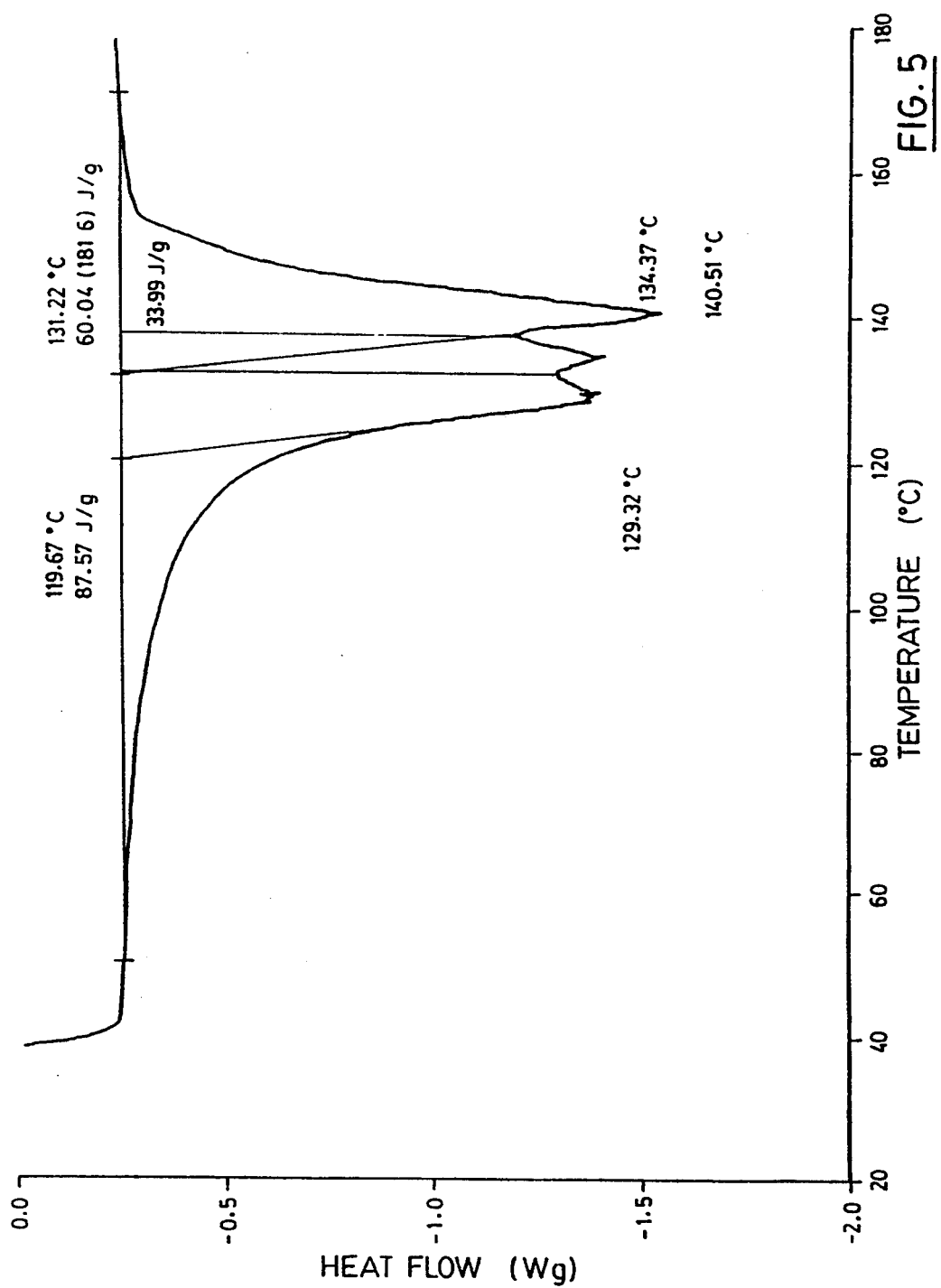

FIG. 5 is a DSC curve of the oriented sample. The peaks in this curve are a fingerprint of the structure formed in the melt crystallized polyethylene. Reference is made to Z. Bashir and A. Keller, Journal of Colloid and Polymer Science, Volume 267, No. 2, pp. 116-124, 1989. The lower melting peaks at 127° C. to 134° C. are due to the melting of the lamellar component. The higher peaks at 140° C. and above (note the subtle shoulder at about 153° C.) are a result of the melting of the extended chain material.

The following parameters and stipulations identify one successful operation of the extrusion portion of this process, i.e. that portion which produces the extrudate shown at 42 in FIG. 1.

1. Extruder: C. W. Brabender Model 2503 ¾" diameter, L/D 25:1, Grooved Barrel (⅛" deep, ⅛" wide grooves);
2. Screw: ¾" diameter, L/D 25:1, Compression Ratio 1.7:1, Based on Hoechst design for HMWPE;
3. Material: Mitsui Petrochemicals Ltd. Hizex 145M UHMWPE powder, $M_w$=1,000,000;
4. Processing Aid: Allied Chemical Corporation, Acuflow ™;
5. Blending: 97.5% Hizex 145M, 2.5% Acuflow (by weight) blended in a Gelimat high speed mixer at 100° C. for 3 min.;
6. Die: Conical, 20° total angle, 0.089" land diameter, L/D of 33;
7. Conditions: Hopper cooled with tap water, Zone 1=135° C. Zone 2=190° C., Zone 3=200° C., Die Adaptor=170° C., Die=160° C. Land section=138° C., 4 RPM;
8. Output: Flowrate=4.8 g/min, Die Pressure=3660 Pa, Melt Temperature=154° C.;
9. Extrudate: Smooth.

The melt-drawing of the extrudate sample produced under the foregoing conditions is identified as follows:

1. Material: Sample of extrudate from above extrusion example;
2. Thermal Treatment (Annealing): Sample heated at 200° C. for 30 minutes;
3. Melt Drawing Temperature: 148° C.;
4. Method of Drawing: Manually between pairs of pliers;
5. Gauge Length: 2 cm;
6. Initial Deformation Strain Rate: $2s^{-1}$ (estimated);
7. Draw Ratio ($A_o/A_f$):30;
8. Cooling: Oriented sample immediately quenched in water while under tension;
9. Tensile Strength: 550 MPa;
10. Tensile Modulus: 30 GPa;
11. Modulus Test Conditions: 10 cm gauge length, 1"/min cross-head speed, modulus measured at 0.1% offset strain.

Experimentation following the development set forth above has determined that the high molecular weight polyethylenes, when melt-extruded through conventional extrusion dies, tend to develop an oriented structure in the polymer which precludes large draw ratios (greater than 10) and the resulting increases in mechanical properties such as strength and modulus.

Experimentation with specially designed dies has revealed that an important process parameter, namely the critical Elongational Velocity Gradient (EVG), must be satisfied in order to extrude a ductile VHMWPE or UHMWPE (i.e., capable of being drawn to very large draw ratios above 10). It was determined that when the combination of die design and throughput speed results in an elongational velocity gradient that is less than the critical Elongational Velocity Gradient, one can produce extrudates capable of being subsequently drawn to high draw ratios. Conversely, if a die design and the corresponding throughput speed result in an EVG that exceeds the critical Elongational Velocity Gradient, then an unfavourable structure develops during extrusion (i.e., an oriented structure), and the extrudate will show little ability to be strengthened through deformation.

Figure 17:
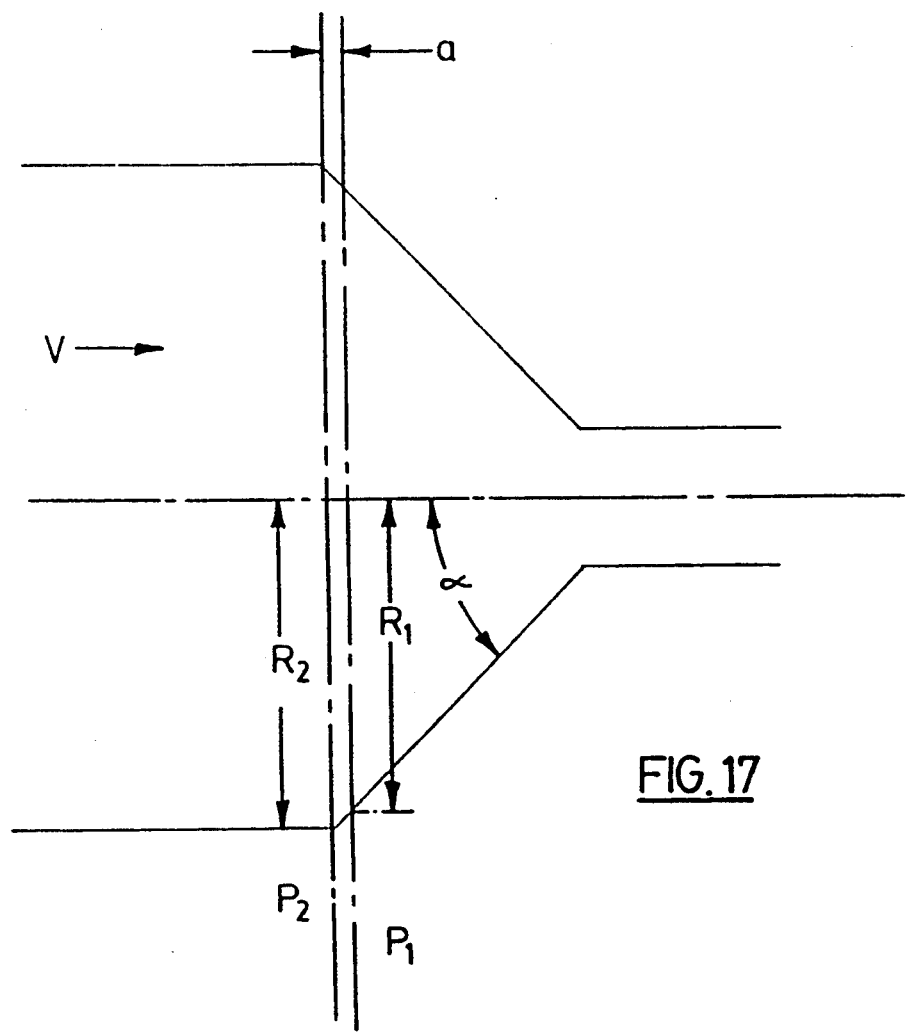
FIG. 17 is a schematic drawing for the purpose of clarifying the elongational velocity gradient.

Referring to FIG. 17, the precise meaning of the term Elongational Velocity Gradient (EVG) will be explained by way of a simplified example. In FIG. 17, a conically converging passageway 80 is marked to show two closely adjacent transverse planes designated $P_1$ and $P_2$, these being separated by a small distance a. At $P_2$ the radius of the passageway is $R_2$, and at $P_1$ it is $R_1$. Assume a velocity $V_2$ at $P_2$. In this configuration, the velocity will be inversely proportional to the cross-sectional areas (assuming plug flow). Thus, at $P_1$ the velocity $V_1$ can be written $$V_1 = V_2 \left( \frac{R_2}{R_1} \right)^2$$

This is based upon incompressible plug flow where Q[volumetric flow rate]=$V_1A_1=V_2A_2$ Since $R_2 = R_1 + a\tan\alpha$, $V_1$ can be written as $$V_1 = V_2 \left[ \frac{(R_1 + a\tan\alpha)^2}{R_1^2} \right] =$$

$$V_2 \left[ \frac{R_1^2 + 2R_1 a\tan\alpha + (a\tan\alpha)^2}{R_1^2} \right]$$

bringing $V_2$ within the brackets and differentiating, $$\frac{dV}{da} = \frac{d}{da}\left[ V_2 + \frac{(V_2)2a\tan\alpha}{R_1} + \frac{(V_2)a^2(\tan\alpha)^2}{R_1^2} \right] =$$

$$\left[ \phi + \frac{(V_2)2\tan\alpha}{R_1} + \frac{(V_2)2a(\tan\alpha)^2}{R_1^2} \right]$$

As a→∅, the third expression becomes negligible, leaving $$\frac{dV}{da} \cong \frac{(V_2)2\tan\alpha}{R_1}$$

Thus, in the case of a conical passageway, the Elongational Velocity Gradient can be expressed as $$\frac{dV}{da} \cong \frac{2V\tan\alpha}{R} \sec^{-1}$$

where $\alpha$ is the semi-angle of the conical configuration, R is the radius at the transverse plane where the EVG is being calculated, and V is the instantaneous plug flow velocity at the same plane.

Though FIG. 17 shows a semi-angle of 45° for the sake of clarity, we will use the more realistic example of a cone with a 5 degree semi-angle ($\tan\alpha=0.0875$). The EVG at a radius of 2 mm, if the velocity there is 22.9 mm/sec, would be approximately $$\frac{(2)(22.9)\tan 5°}{2} \cong 2 \sec^{-1}$$

Further investigations have shown that the die-land length is an important factor to be considered in extrusion dies designed to produce ductile extrudates. If the die-land is too short, then the extrudate may exhibit mild melt fracture and poor dimensional control (e.g. surface flaws). These surface flaws limit the ability of the extrudate to be drawn. When the die-land is too long, some of the structure developed in the converging region (orientation) can be retained, and again the capacity for being drawn will also be reduced. It is considered necessary that the die-land length be optimized for each polymer being extruded.

In-line annealing of the extrudate, immediately after exiting the die, has generally been found to be effective for removing undesirable extrudate structure. Post-die annealing has shown great ability to produce ductile VHMWPE and WHMWPE extrudates when coupled with a properly designed sub-critical EVG die, which maintains the elongational velocity gradient at less than a critical value, and partially relieves residual stress concentrations in the extrudate by selecting the appropriate die-land length.

Under certain special conditions, particularly having to do with the die-land length/diameter ratio, it may be possible to eliminate the annealing step and still attain a capability for high drawing ratios.

SUMMARY OF TEST PARAMETERS

Test Dies

Six coni-cylindrical dies were constructed of aluminum for these experiments. The parameters for these dies are shown in Table 1.

TABLE 1

| Extrusion Test Die Parameters | |
|---|---|
| Die Semiangles (degrees) | 5, 10, 15, 23, 45, 90 |
| Die Land L/D Ratios | 2 . . . 40 approximately |
| Die Land Inner Diameter (mm) | 1.17 . . . 3.26 |
| Extrusion Ratio | 72, 39, 18, 9.2 |

Polymer Resins

A number of VHMWPE and UHMWPE resins were screened for their ability to be drawn to high strength and high modulus. Of these screened resins, Hoechst GUR412 and Mitsui Hizex MIL145M appeared particularly suitable for melt extrusion and post-extrusion deformation. Lubricants VHMWPE and UHMWPE, such as those discussed above, have very high viscosities, estimated to be in the region of 2,000,000 Pa's when interpreted by the Cox- Merz[3]Rule. With viscosities of this magnitude, the wall shear stress (if slip did not occur), is much higher than the strength of the melt, and severe melt fracture would occur.

Extrusion without lubrication was experimentally found to be impractical for the reasons cited. External lubrication was found to be required for smooth polymer flow and visually sound polymer extrudates.

External lubrication of the polymer melt was carried out in two manners. The first method involved injection of a liquid lubricant onto the surface of the melt stream prior to entry into the extrusion die. The second method required blending a commercial lubricant, Acuflow ™, with the polymer prior to extrusion. Both techniques reduced the pressure and allowed extrusion of VHMWPE and UHMWPE resins.

Injection of Liquid Lubricants and Extrusion

A lubrication injection ring was constructed and placed in the extrusion line just prior to the die. Various lubricants at flow rates of 0 to 80 ml/h were used to smooth the flow of the polymer melt into the die. The lubricants injected were ethylene glycol, glycerol and silicone oils.

All of these lubricants reduced the pressure required for extrusion. Some spattering and vapour blow-off were observed with the more volatile lubricants.

Dry Mixing of Polymer Resin and Acuflow Lubricant Prior to Extrusion

Acuflow lubricant was dry mixed with the resins. The concentration of the lubricant was less than 7.5% Acuflow by weight, generally 2.5% Acuflow by weight in a high intensity Gelimat mixer charged with 225–275 g of the mixture. The mixing temperature was in the region of 95°–105° C. for times of approximately 1–4 min. Extrusion of the Acuflow treated resins generally resulted in sound, smooth extrudates. The ductility of extrudates produced with common high angle extrusion dies was limited to extensions generally less than 100%. Extrusion with semi-critical EVG dies formed extrudates which could be cold drawn 300–1000% or greater.

Polymer Velocity Profile in Die-Land and Shallow Dies

Pressure drops predicted by the finite element method (FEM), postulating no slip at the walls, were found to be at least an order of magnitude greater than the pressure found by experiment.

FEM can be used to predict the true slip velocity at the lubricant-polymer interface. The method for predicting the true slip velocity involves calculating the pressure drops for a several fictitious slip velocity boundary conditions. By trial and error of the slip velocity boundary condition, the FEM prediction and the experimental pressure drop can be matched. For this condition the slip velocity is known. In all cases the FEM found the true wall slip velocity to be within 0.2% of the average velocity.

The type of flow in shallow extrusion dies and in the capillary section is essentially plug flow based upon the FEM evidence.

Calculation of Elongational Velocity Gradients

Figure 6:
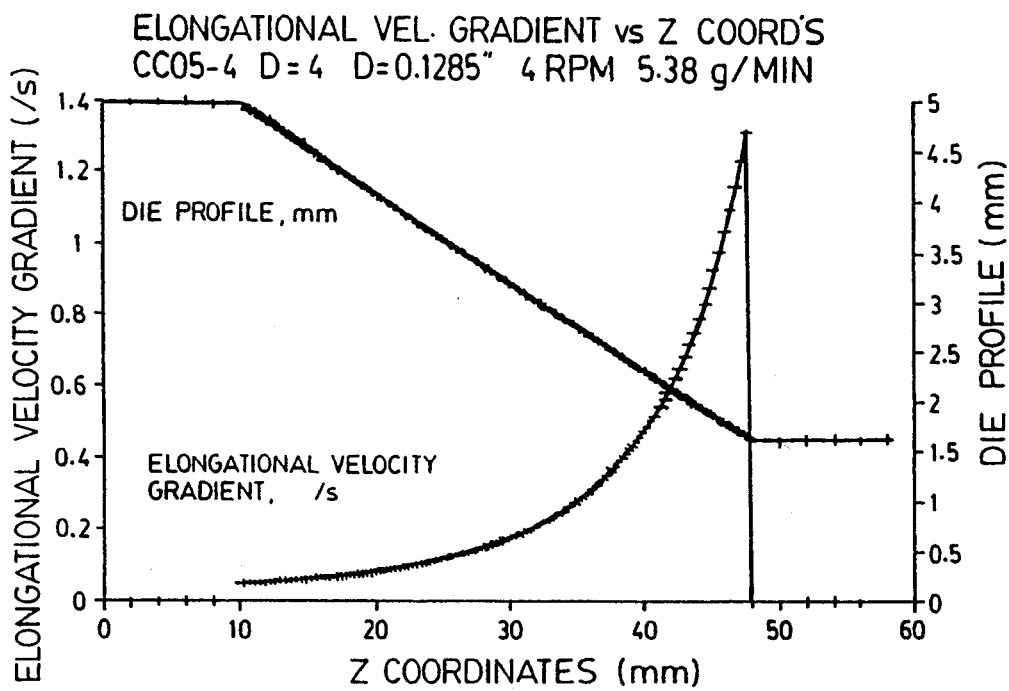
FIG. 6 is a graph showing the calculation of the elongational velocity gradient for a conical die profile.

The elongational velocity gradient can be calculated from the die dimensions and the volume flow rate assuming good lubrication and plug flow. FIG. 6 shows the elongational velocity gradient imposed upon the polymer melt as it passes through a coni-cylindrical die with a semiangle of 5°.

Effect of Elongational Velocity Gradient on Elongation

The elongational velocity gradient in the melt is primarily determined by the volumetric flow rate and the local die angle.

Figure 7:
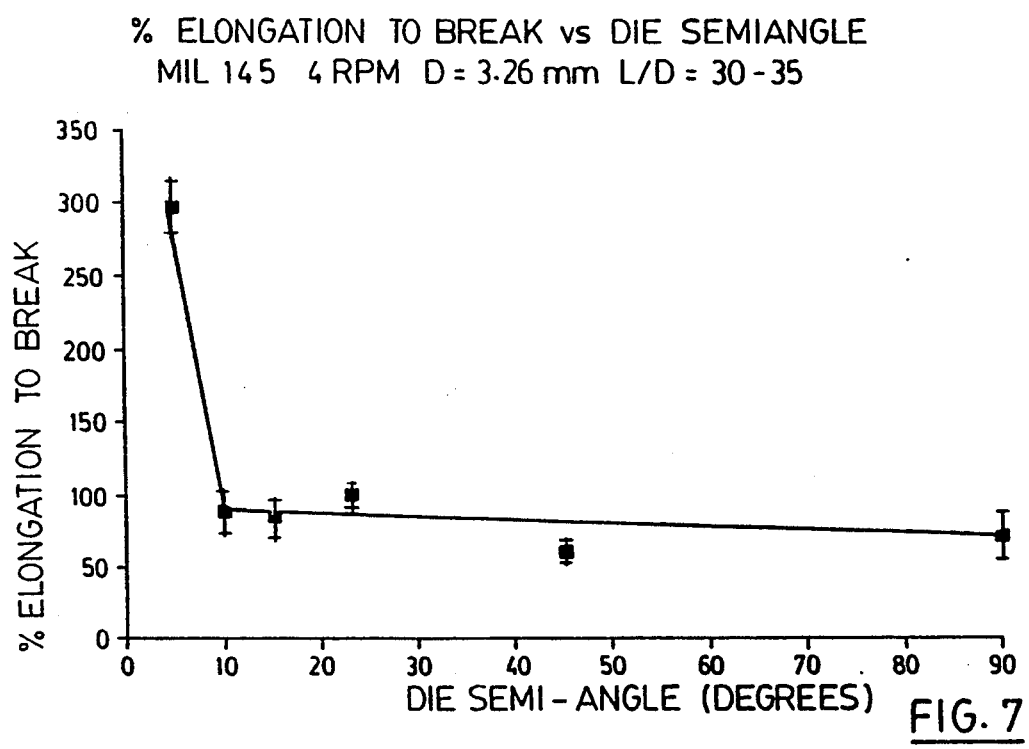
FIG. 7 is a graph of elongation to break vs. the die-angle.

FIG. 7 shows the effect of the extrusion die semiangle on the percent elongation during cold drawing. It is apparent that unusually low die angles result in high elongation (i.e. extreme ductility) for the extrudate.

Figure 8:
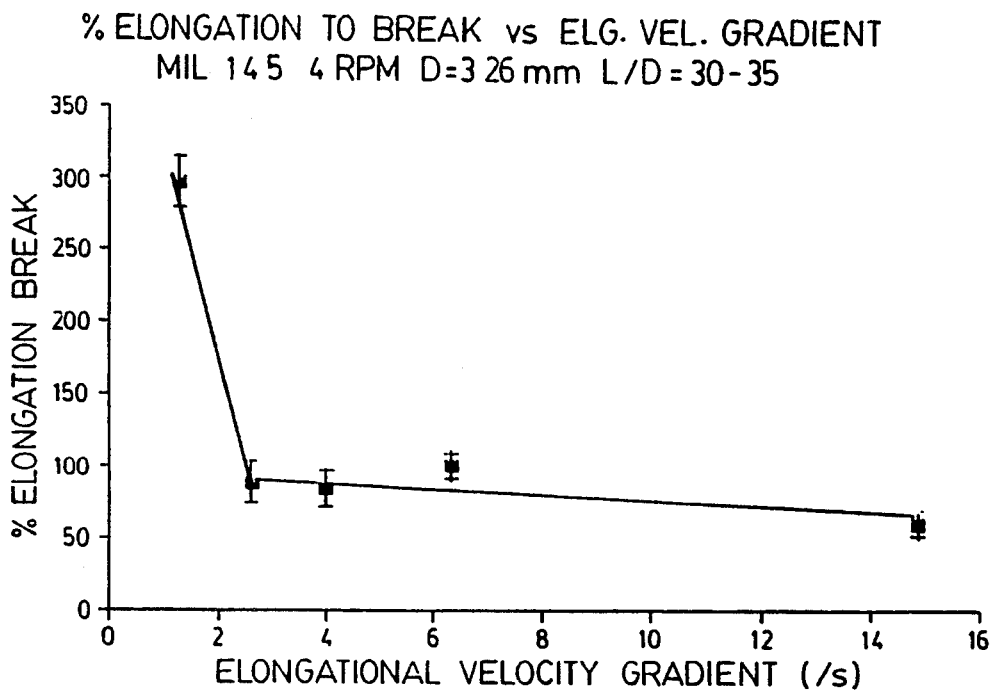
FIG. 8 is a graph showing the elongation to break vs. the elongational velocity gradient.

FIG. 8 shows the data replotted from FIG. 7 in terms of the elongational velocity gradient imposed upon the VHMWPE melt. It can clearly be seen that the elongational velocity gradient has a strong effect on the maximum elongation to break of the Hizex MIL145M extrudate. At an elongational velocity gradient between about $1.3$ s$^{-1}$ and about $2.6$ s$^{-1}$ there is a pronounced increase in the extrudate elongation to break.

Effect of Elongational Velocity Gradient on Extrudate Swell

Figure 9:
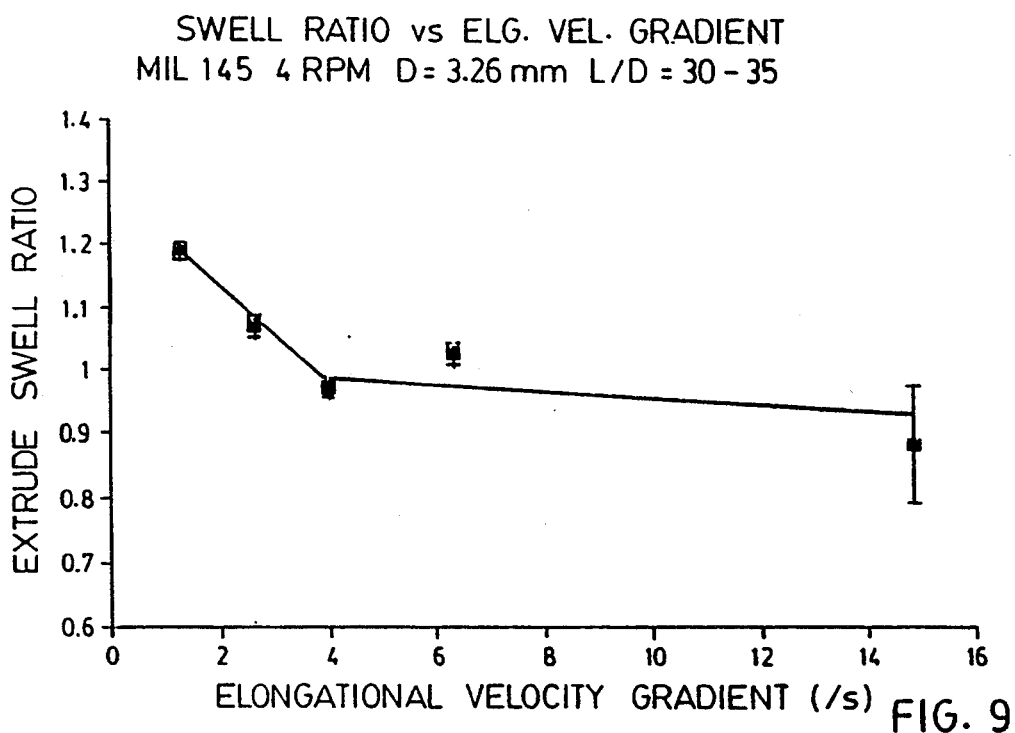
FIG. 9 is a graph showing the swell ratio vs. elongational velocity gradient.

FIG. 9 shows the effect of elongational velocity gradient on the extrudate swelling ratio. Larger swell ratios indicate greater amounts of relaxation of the polymer after extrusion from the die. The lower the elongational velocity gradient, the greater the swell for velocity gradients less than approximately $4$ s$^{-1}$.

Effect of Elongational Velocity Gradient on DSC Properties

Figure 11:
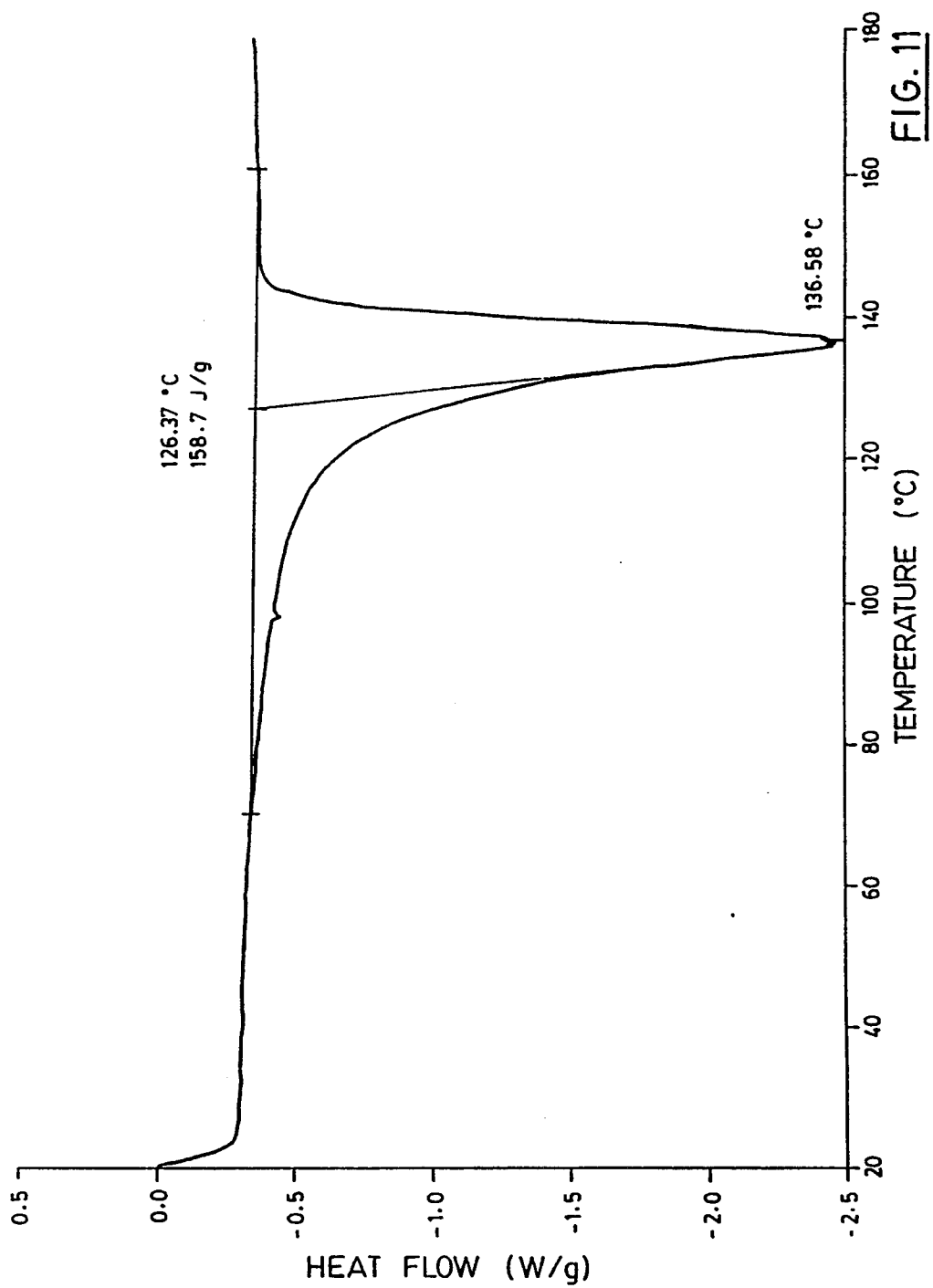
FIGS. 11, 12, 13 and 14 are traces produced by a Differential Scanning Calorimeter (DSC), helpful in understanding this invention.
Figure 12:
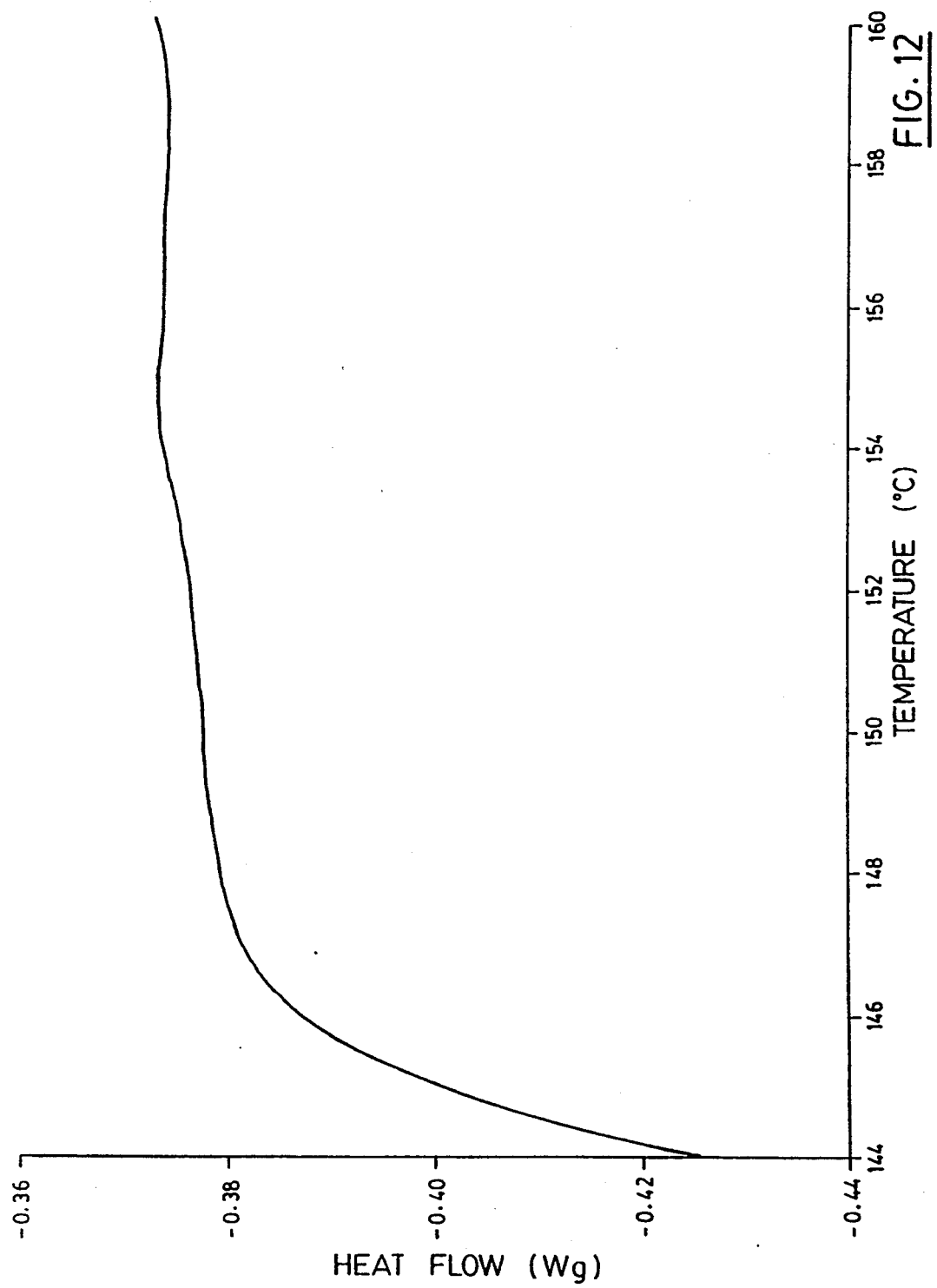

FIG. 11 shows the Differential Scanning Calorimeter trace for the temperature range of 20°–180° C. The curve can be seen to be smooth with a principal endotherm at 136.6° C. closer examination of the curve in the temperature range of 144°–160° C., FIG. 12, shows no evidence of a secondary endotherm. This specimen was found to be very ductile and could be drawn at room temperature to the limits of the tensile test machine (approximately 740% elongation) without breaking.

Figure 13:
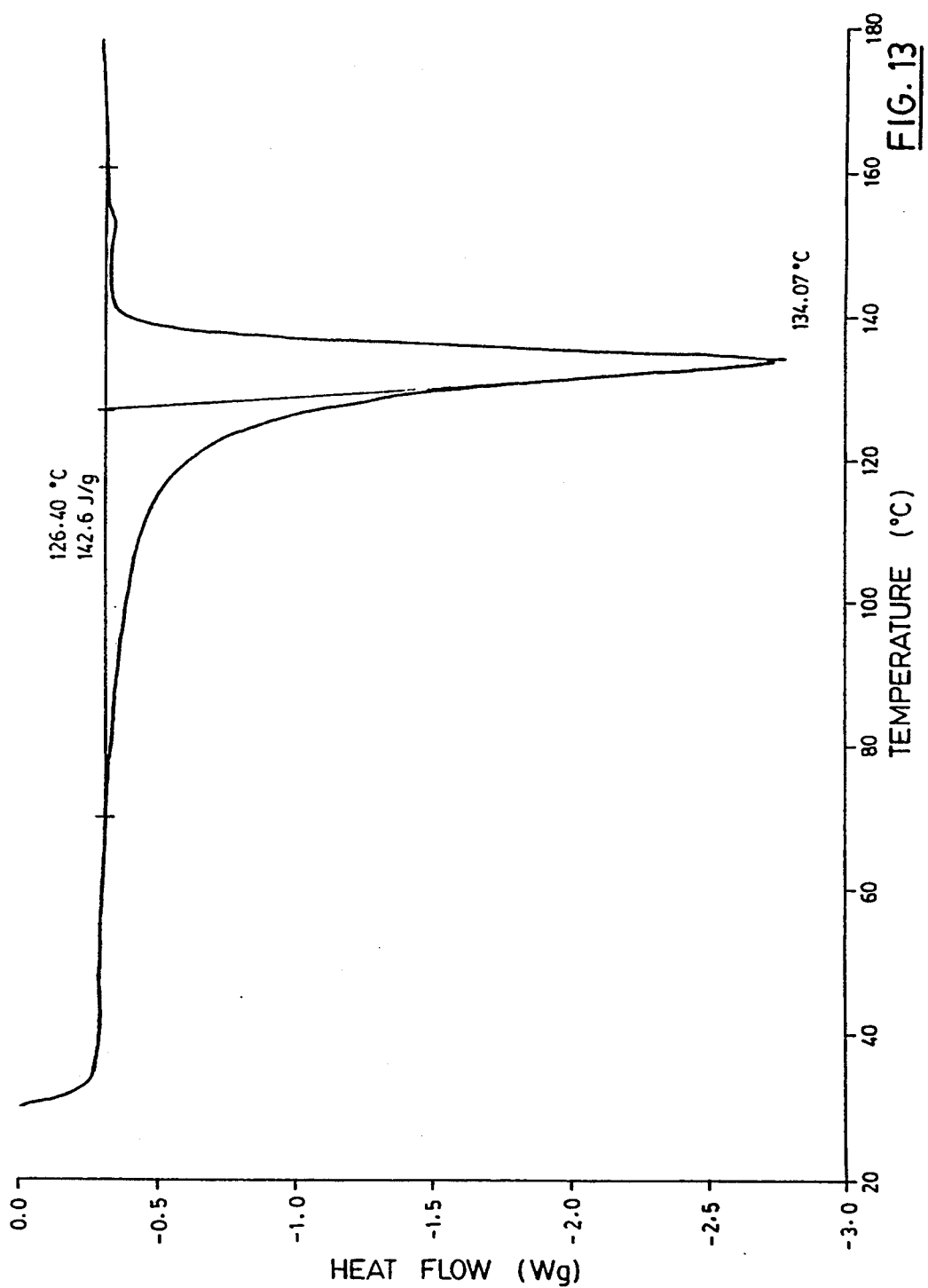
Figure 14:
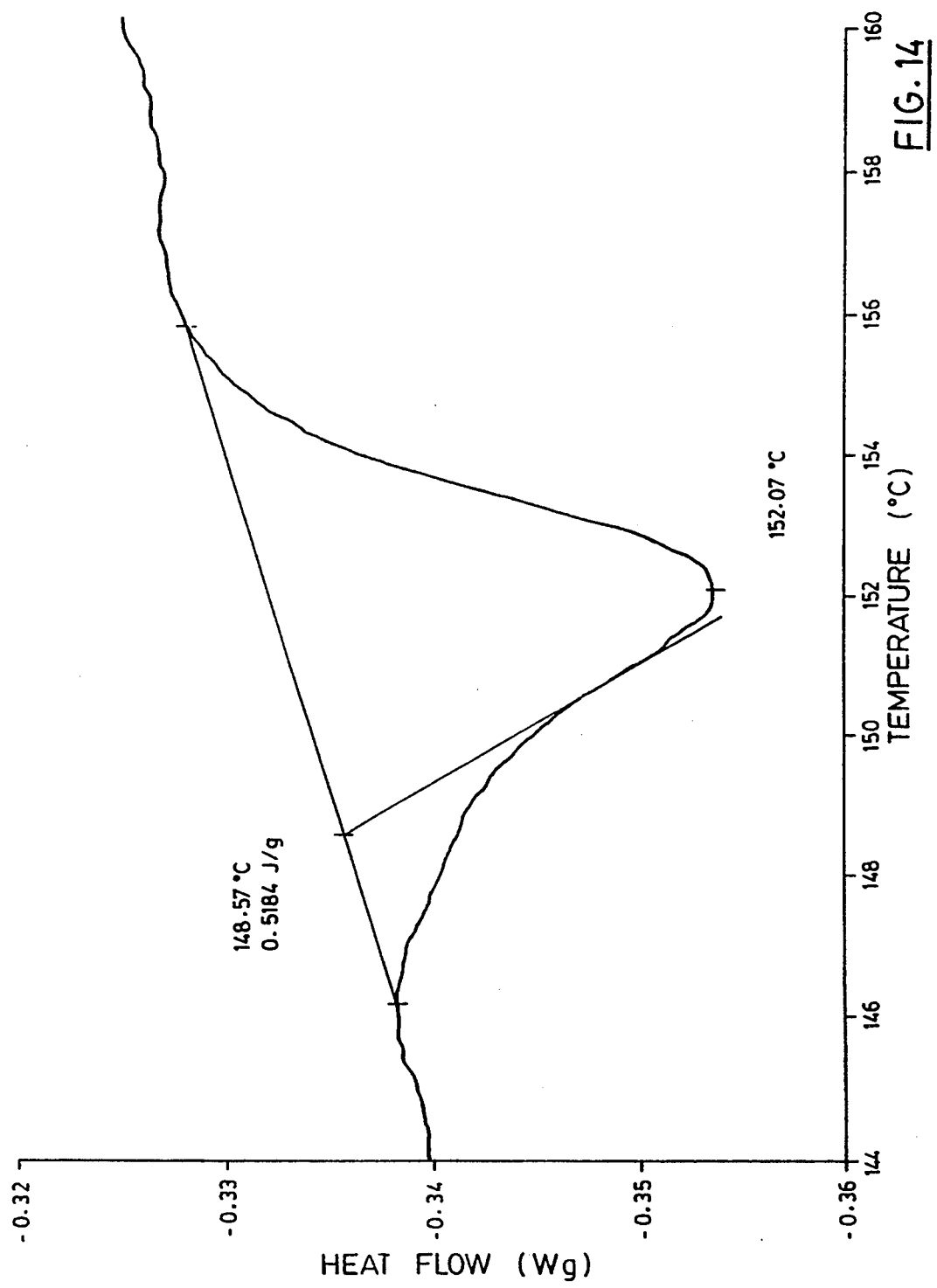
Figure 15:
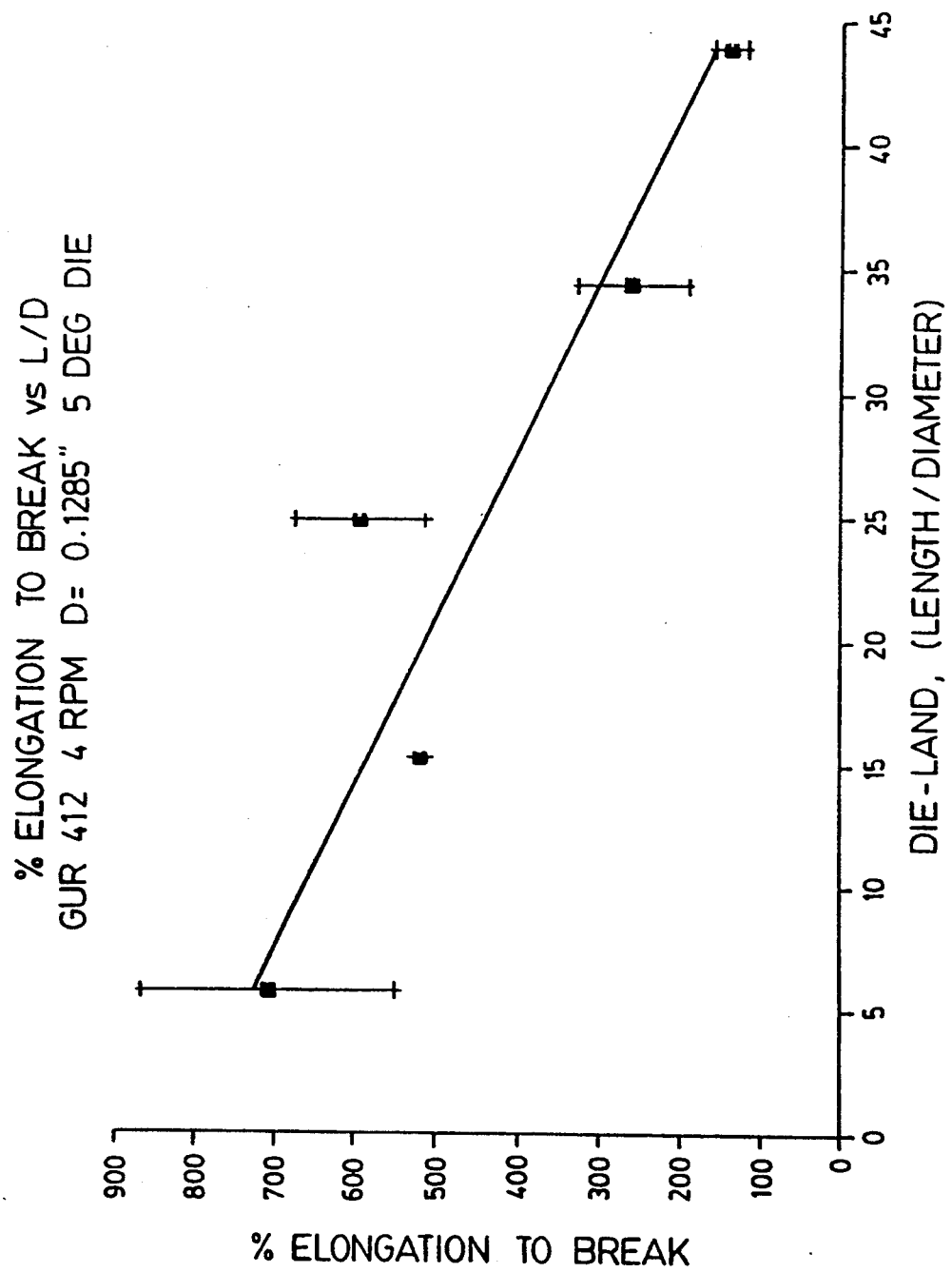
FIG. 15 is a graph showing elongation to break vs. die-land length/diameter using a 5° die semi-angle.
Figure 16:
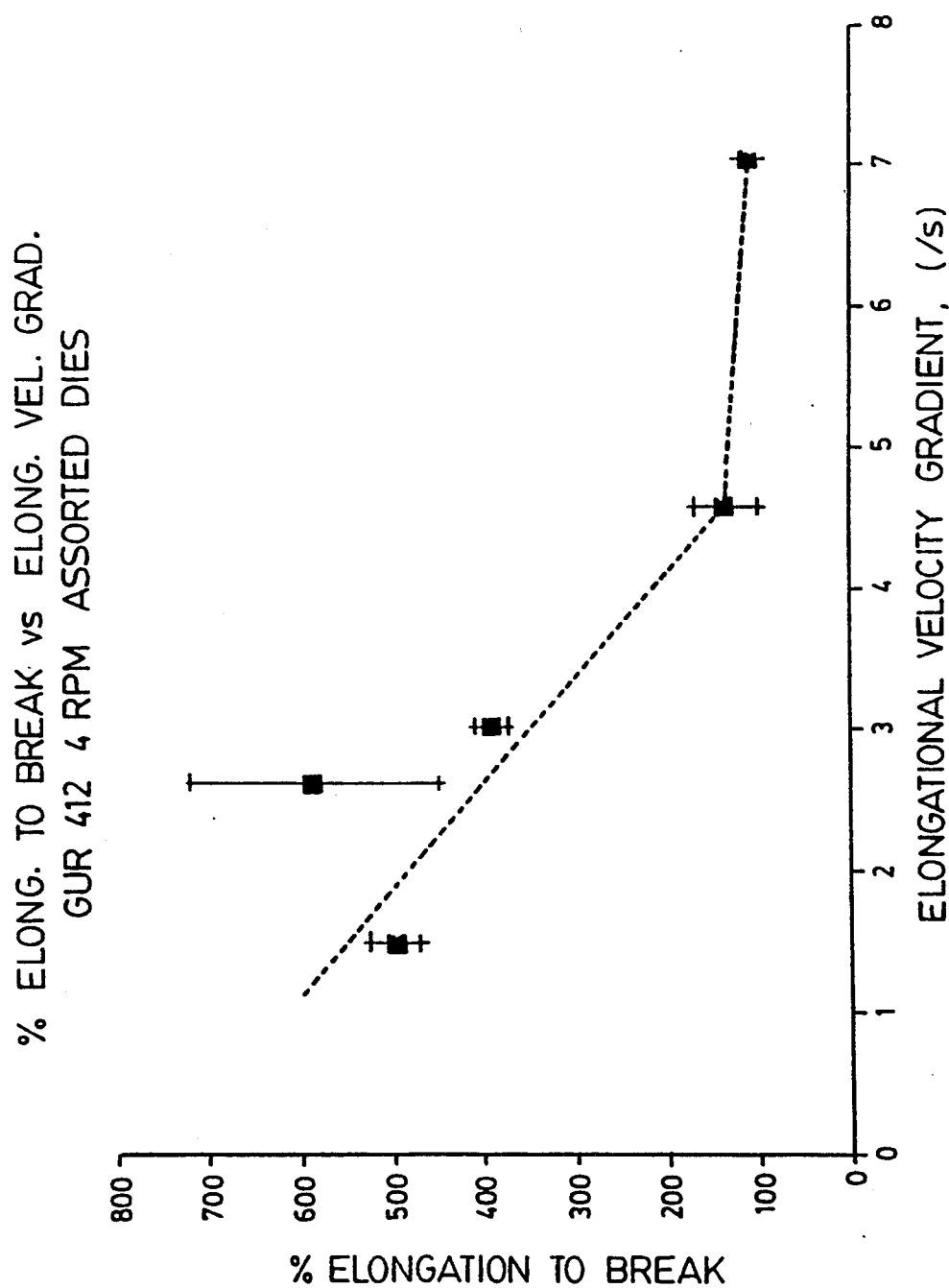
FIG. 16 is a graph showing the elongation to break vs. the elongational velocity gradient using several dies.

A different picture is shown in FIG. 13. In the temperature region of 152° C. a small endotherm, indicating chain extended microfibril material, is detected. FIG. 14 shows a closer view of the region from 144°–160° C. In this FIG. 14 the secondary endotherm is shown unquestionably. This is clear evidence that a small amount of chain extended material is present. The presence of chain extended material drastically reduces the ultimate elongation of the extrudate, and elongation of this sample was only 90.5±23.3%.

Effect of Die-Land Length and In-Line Annealing on Elongation

Figure 10:
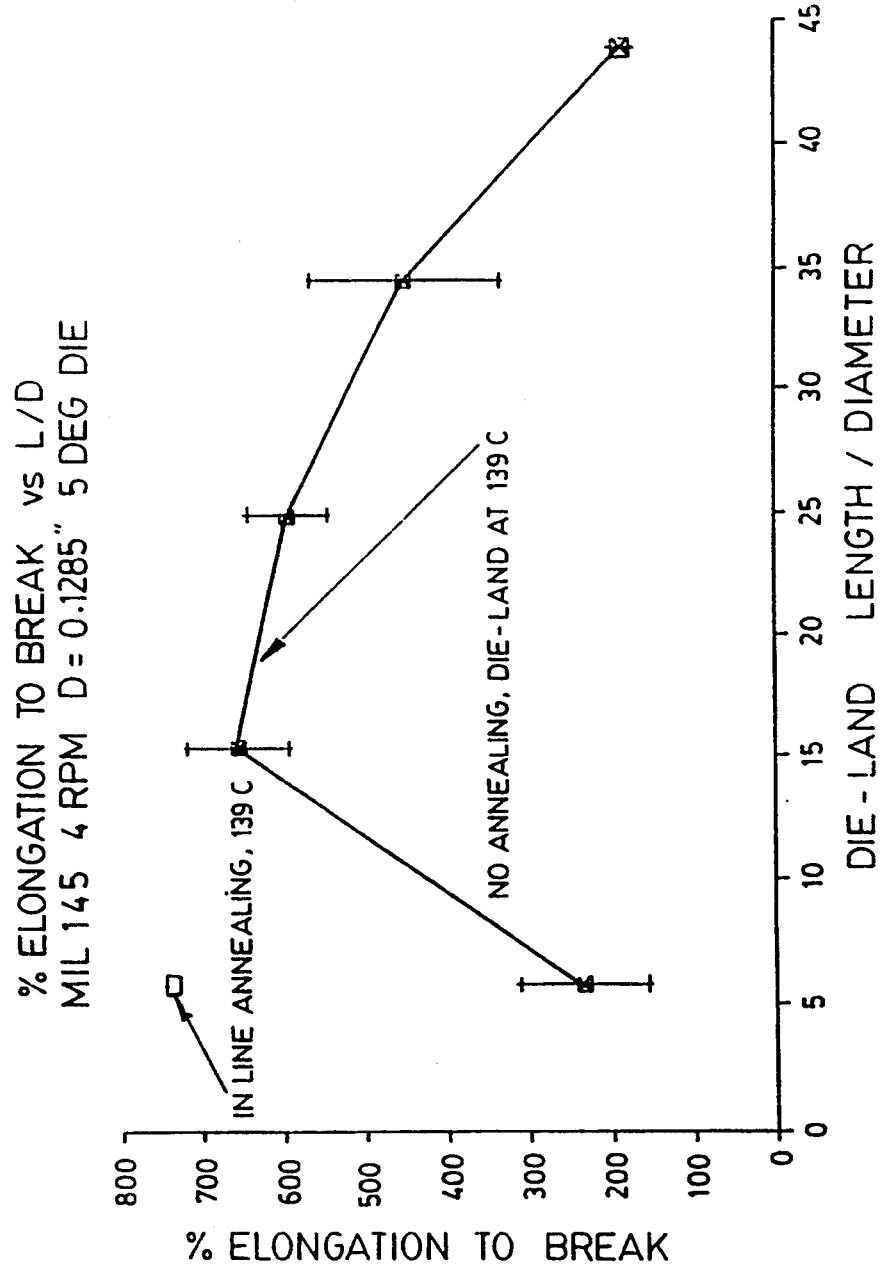
FIG. 10 is a graph showing the elongation to break vs the die-land length/diameter ratio.

The effect of die-land length and in-line annealing as the polymer exits the die is shown in FIG. 10. The die-land was allowed to vary from a L/D ratio of approximately 6 to 44, where the die diameter exit was fixed at 3.26 mm. Even without annealing, the elongation to break was large for L/D ratio of approximately 16 to 35. It is considered that L/D ratios as low as 10 would produce large elongations to break, without requiring annealing.

The graph of FIG. 10 also shows (at upper left) the effect of in-line annealing on percent elongation to break. Specifically, examination of FIG. 10 shows that in-line annealing substantially increased the elongation to break for specimens prepared with a 5° semiangle die and L/D of 6. If in-line annealing is carried out immediately as the extrudate exits the die, the elongation to break improves from 240% to 740%. In-line annealing is a very effective technique to increase the ultimate elongations of VHMWPE and UHMWPE extrudates.

Specific Die Design

Figure 18:
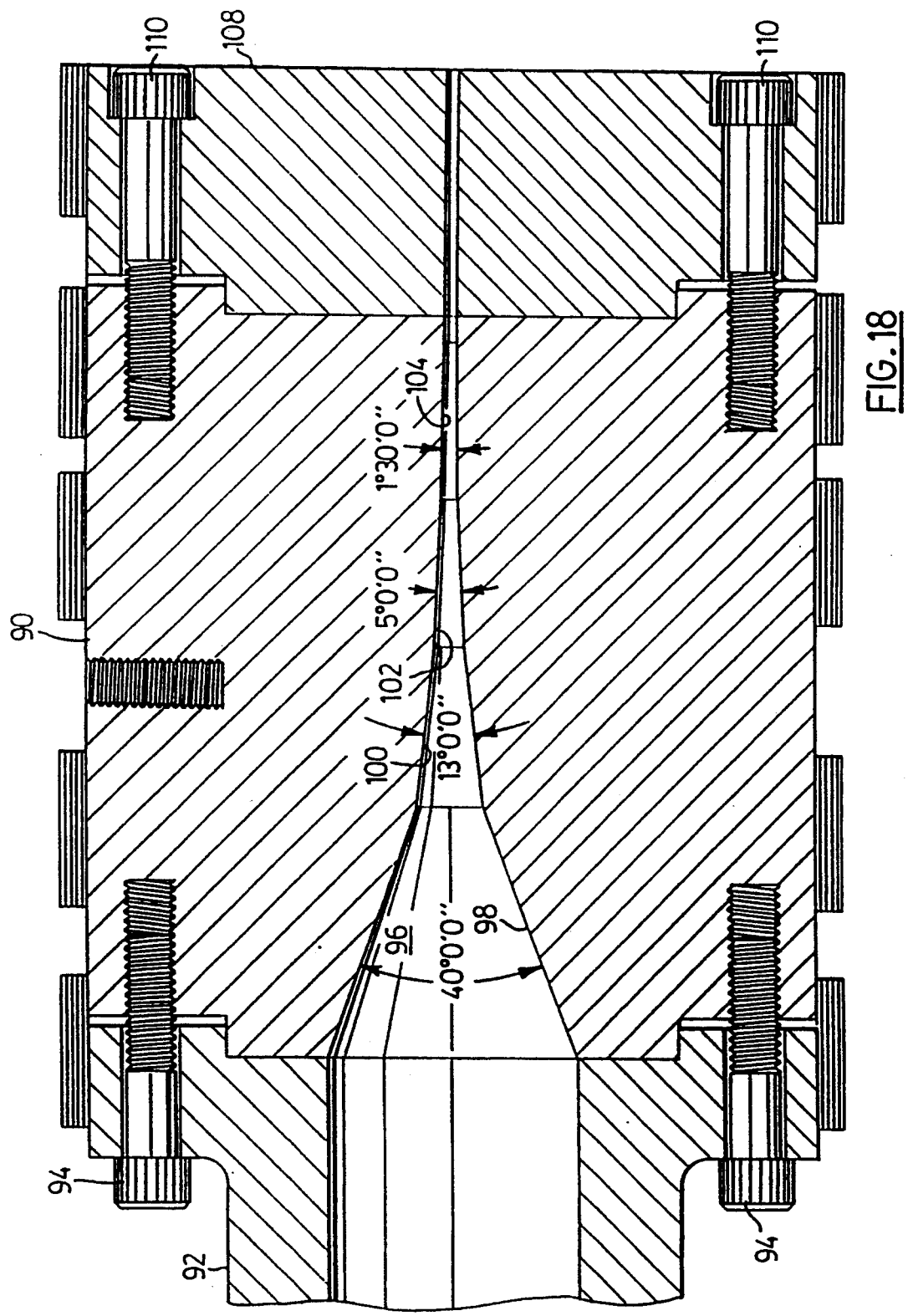
FIG. 18 is an axial sectional view through an experimental die and die-land block, illustrating one possible passage configuration for a die.

Computer simulations have revealed that in order to keep the stretch rate (EVG) to small values in the region of 1.5 s$^{-1}$ and smaller, the flow angles must be small and the transition must be very gradual. Ideally, a hyperbolic die could provide both low and constant stretch rate, however such a die may be difficult to manufacture. A good approximation to a hyperbolic die can be obtained by using four taper angles, as illustrated in FIG. 18. The die shown in FIG. 18 is designed for an extruder output in the range 20–50 kg/hr for the production of 0.125" by 3" tape. There are four taper angles (semiangles), namely 20°, 6½°, 2½°, and 0° 45'. The computer simulation at a flow rate of 50 kg/hr gave a maximum stretch rate of 0.82 s$^{-1}$, which is about half the selected 1.5 s$^{-1}$. At lower values of the flow rate, the stretch rate will obviously be even lower.

Turning to FIG. 18, there is illustrated a die 90 which is adapted to be fastened to a conventional extruder 92 by fastening devices 94 in the usual manner. As can be seen, the die 90 has been machined to provide a passage 96 in which the cross-section diminishes in the rightward direction. More specifically, the passage 96 includes a first portion 98 having a total angle of 40° 0' (semiangle of 20° 0'), a second conical portion 100 having a semiangle of 6½°, a third conical portion 102 having a semiangle of 2½°, and a fourth conical portion 104 having a semiangle of 0° 45'.

In addition, FIG. 18 shows a die-land block 108 which is adapted to be fastened against the rightward end of the die 90 by suitable fasteners 110. By making the portion 108 removable, die-lands having different L/D ratios can be tested.

Although this invention has been described using a single-step drawing process, those skilled in the art will appreciate that multiple step drawing of the extrudate could be of advantage in permitting different strain rates and different temperature regimes for the different stages.

Additionally, it may prove advantageous to draw the extrudate in a separate process which is not continuous with the extrusion.

Further Experimental Results

Hot Drawing of VHMW Polyethylene Extrudates

Bench scale extrusions were undertaken with Hizex MIL145M (containing 2.5% ACuflow lubricant) in order to establish the optimum extruder operating conditions for producing UHMW polyethylene extrudates having extreme drawability at temperatures near the melting point. The UHMW polyethylene was extruded at 155° C. through a constant velocity gradient die (hyperbolic shape) at an extrusion ratio of 5/1. The elongational velocity gradient under these conditions was less than 0.4 sec$^{-1}$. The resulting smooth cylindrical extrudates were approximately 4.5 mm in diameter.

The extruded rod was cut to a length of approximately one meter and mounted horizontally inside an oven with the ends projecting from each side of the oven through small openings so that one end could be firmly clamped to a stationary surface and the other free end gripped in the belts of a Killion Belt Puller such that the mid-section could be uniformly heated to constant temperature while mounted in a stationary position. The test section inside the oven was heated to equilibrium for 20 minutes at 135° C. before drawing was commenced with the puller. The length of the heated rod section was 0.15 m (0.5 ft). The drawing was initiated by activating the puller which was preset at drawing speeds of 0.3 m/min to 2.1 m/min (1 to 8 ft/min). In some experiments the pulling rate was readjusted partway through the drawing trial, in order to reduce the drawing speed.

In the series of tests at constant speed the draw ratios varied from 35 at draw rates of 2.4 m/min to a draw ratio of 235 at a slower draw rate of 0.3 m/min. Each sample was drawn continuously until rupture occurred. The elapsed time to rupture at the highest drawing rate was 30 seconds, whereas the time to rupture at the slowest drawing rate was 380 seconds.

These experiments illustrate the very high ductility which is achievable with UHMWPE extrudates when extruded at sub-critical elongational velocities. Such extrudates can be hot drawn to ratios greater than 200 depending upon the strain rate and temperature. Such large draw ratios are unreported in the literature and are an important precondition for drawing polyethylene to very high modulus.

Extrusion-Drawing of UHMWPE

Several UHMW polyethylene resins were extruded and optionally drawn from a constant velocity gradient die at die pressures between 600 and 3000 psi. The crystallized extrudate (4.5 mm diameter rod) was pulled from the die using a Killion Belt Puller. All resins contained 2.5 percent lubricant (ACuflow).

| Polyethylene Resin | Molecular Weight (Mg/mol) | |
|---|---|---|
| | | Intrinsic Viscosity |
| Himont LF00459 | 5.25–5.75 | 29 |
| Himont HB312CM | 2.0–3.2 | 24 |
| | | Flow Value |
| DSM Stamylan UH210 | 1.7 | 0.23 N/mm$^2$ |
| DSM Stamylan UH410 | 2.5 | 0.36 N/mm$^2$ |

The above UHMW polyethylenes were extruded through a constant velocity gradient die (hyperbolic shape) with an extrusion ratio of 5/1 at screw speeds between 1 and 8 rpm. The barrel temperatures were set at 200° C. and the die temperatures between 120° and 150° C. Under these conditions the velocity gradient was less than 0.05–0.4 sec$^{-1}$ depending upon the extruder rpm. The crystallized extrudate was drawn from the die with the Killion Belt Puller. The draw speed to extrusion speed is defined here as the ratio of the puller speed to the free extrusion speed (no tension). The draw speed to extrusion speed was varied from 1 (no tension) to 2. The draw down (diameter reduction) of the extrudate rod between the die and the puller was typically greater than 1 and less than 1.03, i.e. the actual reduction was almost zero.

Using Himont LF00459, smooth extrudates were produced at die temperatures between 145° and 155° C. The extruder rpm varied from 1 to 4 rpm. The maximum extrusion rate was 25.6 m/h (84 ft/h) at a draw to extrusion ratio of 1.2 to 2.0. Both DSM UH210 and UH410 produced smooth, high quality extrudates at die temperatures between 125° and 155° C. Optimum extrusion conditions were at a draw speed to extrusion speed of 2.0 at 4 rpm. The maximum extrusion rate was 25.6 m/h (84 ft/h). The extrudates from Himont HB312CM were rough and did not produce satisfactory extrudates under these conditions. Certain additives in this particular resin (believed to be calcium stearate) may have been responsible for this behaviour.

The molecular draw ratio of the extrudates (from shrinkage tests) was between 3.9 and 5.2 depending upon the extrusion conditions using a die with an extrusion area ratio of 5. The extrudates formed at die temperatures of 125°–135° C. were relatively translucent with a melting transition 3.3° C. above normal. The engineering tensile stress at break was 140–210 MPa for the oriented polyethylene depending upon extruder die temperature (the manufacturer specified 40 MPa tensile stress at break for this material). The corresponding Young's modulus values were 1.24–2.0 GPa. It is evident that the area ratio of the die controls the molecular draw ratio to a large degree, and also controls the resulting mechanical properties of the extrudate, with larger area ratio dies producing proportionately larger draw ratios and increased mechanical properties.

While one embodiment of this invention has been illustrated in the accompanying drawings and described hereinabove, it will be evident to those skilled in the art that changes and modifications may be made therein without departing from the essence of the invention, as set forth in the appended claims.

The embodiments of the invention in which an exclusive property or privilege is claimed are defined as follows:

1. A process for the continuous production of a high modulus extrudate, including the steps:
   a) continuously forcing a high molecular weight plastic material through a passage in a die, the die having a die exit, the passage having a cross-sectional area which decreases in the forward direction of plastic flow, thereby to produce an extrudate at the die exit, said plastic material being substantially free of diluents and solvents,
   b) lubricating the plastic material adjacent the passage to obtain substantially plug flow of the material through the die passage,
   c) moving the plastic material through the die passage at a speed profile which is such as to result in a smooth, high quality extrudate,
   d) adjusting the temperature of the die so as to cause the plastic material to at least partially crystallize within the die prior to extrusion, and
   e) applying a tensile force to the crystallized extrudate as it emerges from the die, thus aiding the extrusion process.

2. The process claimed in claim 1, in which, under part c), the plastic material is moved so as to attain a substantially constant velocity gradient not exceeding about 0.4 sec$^{-1}$.

3. The process claimed in claim 1, in which the temperature of the die, at least adjacent the downstream end of the passage, lies in the range from about 120° C. to about 150° C.

4. The process claimed in claim 1, in which the temperature of the die adjacent the die exit is such as to keep the plastic material that is adjacent the die exit within the range of about 125° C. to about 135° C.

5. The process claimed in claim 1, in which said tensile force is such as to cause a diameter reduction in the extrudate, downstream of the die, lying in the range from about unity to about 1.03.

6. The process claimed in claim 1, in which the plastic material is forced through the passage by a screw extruder to which the plastic material is fed, said lubrication being accomplished by adding 2.5% ACuflow lubricant to the plastic material prior to its being fed into the extruder.

7. The process claimed in claim 1, in which the plastic material is an UHMW polyethylene having a molecular weight between about 1,700,000 and about 5,750,000.

8. The process claimed in claim 2, in which the temperature of the die, at least adjacent the die exit, lies in the range from about 120° C. to about 150° C.

9. The process claimed in claim 8 in which the temperature of the die adjacent the die exit is such as to keep the plastic material that is adjacent the die exit within the range from about 125° C. to about 135° C.

10. The process claimed in claim 9, in which said tensile force is such as to cause a diameter reduction in the extrudate, downstream of the die, lying in the range from about unity to about 1.03.

11. The process claimed in claim 10, in which the plastic material is forced through the passage by a screw extruder to which the plastic material is fed, said lubrication being accomplished by adding 2.5% ACuflow lubricant to the plastic material prior to its being fed into the extruder.

12. The process claimed in claim 11, in which the plastic material is an UHMW polyethylene having a molecular weight between about 1,700,000 and about 5,750,000.

* * * * *